May 1, 1962  H. N. SHER  3,032,476
CONTINUOUS PROCESS FOR THE PRODUCTION OF YEAST
Filed July 21, 1958
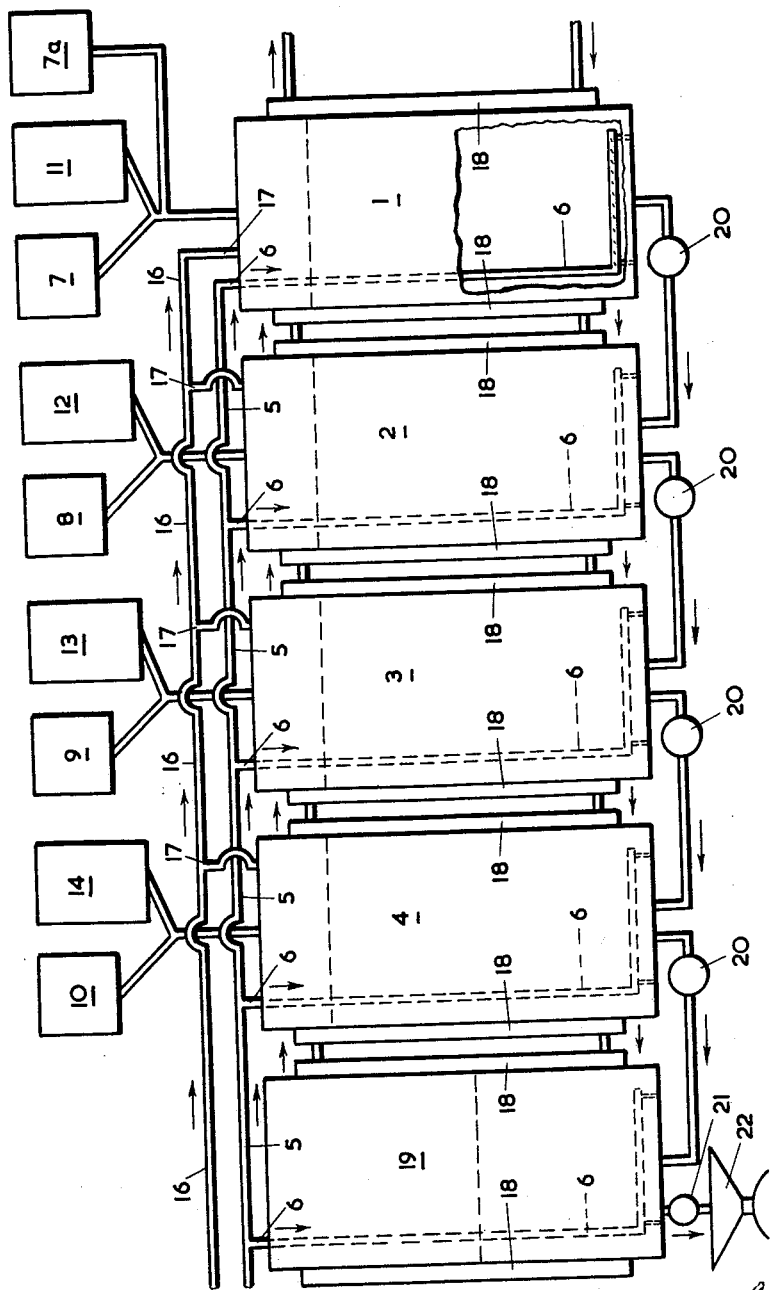
Inventor
Harry Nathan Sher
by Albert Jacobs
Attorney

United States Patent Office 3,032,476
Patented May 1, 1962

3,032,476
CONTINUOUS PROCESS FOR THE PRODUCTION OF YEAST
Harry Nathan Sher, London, England, assignor to The Distillers Company Limited, Edinburgh, Scotland, a British company
Filed July 21, 1958, Ser. No. 749,712
Claims priority, application Great Britain Aug. 3, 1957
9 Claims. (Cl. 195—94)

The present invention relates to an improved method for the production of yeast, particularly baker's yeast.

At the present time baker's yeast is commonly produced by a batch fermentation process in a single vessel of large capacity, for example from 10,000 to 20,000 gallons. In such vessels a suitable liquid nutrient medium is seeded with yeast and air is passed through the medium during multiplication of the yeast cells. In order to obtain yeast having the desired properties for commercial use and in high yield, it is the usual practice to ensure that only a limited amount of nutrients is present during the growth of the yeast.

Such nutrients, at least with regard to the source of carbon, for example molasses, are commonly added exponentially to provide the desired limited concentration of nutrients during the exponential growth of the yeast.

It has been found necessary in order to produce commercially acceptable yeast to include a short period, for example of 1 to 2 hours at the end of the fermentation during which the addition of nutrients is reduced or stopped and the rate of aeration reduced or stopped. This period is known as the ripening stage.

It has hitherto proved difficult to operate a continuous process for the production of yeast which consistently provides a yeast of commercially acceptable quality.

It is an object of this invention to provide such a continuous process.

Accordingly the present invention is a continuous process for growing yeast under conditions of aeration in a liquid nutrient medium in two fermentation vessels which comprises introducing into the first vessel yeast, nutrients and water, continuing the growth of the yeast and the addition of nutrients and water until the desired quantity of yeast and medium in this vessel has been reached, thereafter continuing to add nutrients and water to the first vessel and continuing to grow yeast therein while maintaining the volume of its contents and concentration of yeast cells constant by transferring to the second vessel yeast-containing medium at a rate equal to the rate of addition of nutrients and water, adding nutrients and water to the second vessel until the desired quantity of yeast and medium in this vessel has been reached and thereafter continuing to add nutrients and water and continuing to grow yeast therein while maintaining the volume of its contents and concentration of yeast cells constant by withdrawing yeast-containing medium at a rate equal to the rate of addition of the nutrients, water and yeast-containing medium, passing the withdrawn mixture into a further vessel where yeast ripening conditions are maintained and thereafter recovering the yeast cells, the conditions of fermentation in the two fermentation vessels and rate of transfer being so controlled as to provide a growth modulus as hereinafter defined in the range of 0.05 to 0.20.

Suitable liquid nutrient media for the growth of yeast are well known in the art. Such media contain sources of assimilable carbon, for example molasses and sources of assimilable nitrogen, for example ammonium ions, together with other inorganic ions, such as phosphate ions, and growth factors.

The nutrients which are added to the fermentation vessels during the growth of the yeast cells usually comprises molasses and ammonium salts for example the hydroxide, sulphate, and phosphate as the diammonium salt. The addition of the sulphate and hydroxide serves to control the pH value of the medium in addition to providing assimilable nitrogen. The phosphate is preferably added only to the earlier fermentation vessel in the present process.

It is advantageous in the operation of the process to add the nutrients as relatively concentrated aqueous solutions and to make up the desired volume of medium in the fermentation vessel by additions of cold sterile water for example at a temperature below 25° C. which may amount to as much as 5% to 10% of the total volume. By this means valuable additional cooling of the fermentation medium in the vessels can be achieved, since dissipation of heat from large fermentation vessels may present considerable difficulty, particularly in warm weather.

By the use of separate fermentation vessels before the ripening stage it is ensured that variations in fermentation conditions can be more readily achieved and controlled. In a single vessel batch process for the production of yeast the temperature rate of nitrogen and molasses feed, addition of phosphate and pH of the medium are varied at certain stages in the growth of the yeast in a single volume of medium to obtain a commercially acceptable yeast. These variations are difficult and slow to produce in a large volume of medium.

In the present process these variations are obtained by maintaining the medium in one or more of the vessels under the required conditions of nutrient concentration, temperature, pH value, and rate of aeration unchanged and by passing the cells through the vessels with appropriate mean retention time before recovery.

While the process of the present invention can be carried out using two fermentation vessels before the ripening stage it is preferred that more vessels should be used, for example three to six. By the use of a large number of vessels the process is rendered more flexible and the variations in conditions more readily achieved.

It has been found necessary, in order to produce yeast of acceptable commercial quality to include a ripening stage in the present process. Such a stage may conveniently comprise an additional vessel through which the medium containing yeast cells passes before recovery and in which the feed of nutrients is reduced and stopped. The rate of aeration is also varied, preferably by decreasing the amount of air passing through the medium. It has been found that a comparatively short exposure to such conditions, for example about 1 to 2 hours is sufficient to give proper ripening.

By the term "growth modulus" is meant the rate of production of yeast per unit amount of yeast. The units used in this specification are (grams/hour) per gram of yeast.

In a continuous fermentation the amount of yeast is maintained at a constant value in any fermentation vessel by adjusting the conditions of fermentation and the rate of transfer so as to remove yeast from the fermentation vessel to another vessel or to the ripening stage at the same rate as that at which it is increasing due to growth in the vessel with or without transfer from a preceding vessel. When the process is operating to provide an output of yeast over a period of time during which the concentration of yeast cells and the volume of medium in the fermentation vessels remains substantially constant, the process is said to be operating under "steady state" conditions.

During "steady state" conditions nutrients, and if desired, water in addition to that containing the nutrients, are added to each fermentation vessel at a constant rate to maintain constant the concentration of yeast cells and the volume of medium in the vessel.

It has been found that under "steady state" conditions a yeast of commercially acceptable quality is produced when the growth modulus in all fermentation vessels before the ripening stage is maintained in the range 0.05 to 0.20 and preferably in the range 0.075 to 0.175.

A growth modulus in excess of 0.20 would provide conditions for the yeast cells which give a yeast which is unsuitable for commercial use. A growth modulus below 0.05 gives a commercially impracticable process because of excessively high yeast concentrations in the vessels.

In order that the process of the present invention may be clearly understood a general description of the process is given hereafter.

The process is conveniently divided into three phases
(a) "Starting up" phase
(b) "On stream" phase
(c) "Closing down" phase

(a) "STARTING UP" PHASE

The first fermentation vessel of a series of $n$ fermentation vessels and a ripening stage (preferably having $n=3$ to 6) containing nutrient medium is seeded with yeast and this is allowed to multiply, preferably with exponentially increasing quantities of nutrients and air, at a suitable hourly growth rate until the time when the exponential feed of nutrients and air ceases and is replaced by a constant rate of nutrient feed and aeration, preferably equal to the maximum value reached during the increase.

Alternatively, a volume of yeast-containing medium may be produced in a separate vessel by a batch fermentation process and the medium, after concentration and storage if desired, may then be fed to the first fermentation vessel of the series and a feed of nutrients and water and a aeration at a suitable rate provided to this vessel to allow growth of the yeast therein.

When an amount of yeast is present in the first vessel of the series equal to that in the "on stream" phase described below, the volume of the medium is adjusted to the predetermined value while the feeds of nutrients, and, if desired, additional water are maintained constant and transfer to the second vessel of the series is commenced at a rate which removes yeast-containing medium to maintain the concentration of yeast and volume of medium constant in the first vessel.

The growth modulus employed will depend upon the rate at which yeast-containing medium is transferred between vessels and can be adjusted by variation of this rate to fall within the desired range of 0.05 to 0.20, and preferably 0.075 to 0.175.

When the transfer of yeast-containing medium from the first vessel is proceeding at a constant rate and while the concentration of yeast and the volume of medium in the vessel is maintained at a constant level, the vessel is operating under "steady state" conditions.

Transfer of yeast-containing medium to the second vessel is continued at a steady rate as previously described and to this vessel are supplied nutrients and air preferably in exponentially increasing quantities until the maximum nutrient feed rate desired is achieved and maintained until the desired amount of yeast is formed to give the predetermined concentration in the vessel when made up to a predetermined volume before commencing transfer either to a ripening stage, or, preferably to at least one more fermentation vessel where the process is repeated.

After all the fermentation vessels of the series $n$ have been filled and are operating under steady state conditions as described above yeast-containing medium is then withdrawn continuously from the last fermentation vessel and passed through a further vessel which serves as a ripening stage. The average retention time in the ripening stage is determined by the volume of liquid in the vessel and this volume is adjusted as desired, preferably to give an average retention time of 1 to 2 hours.

The rate of addition of nutrients to the ripening stage is less than that to vessels 1 to $n$ and preferably no nutrients are added to this vessel. The rate of aeration is also less than to vessels 1 to $n$.

Yeast containing medium is removed continuously from the ripening stage to a recovery stage wherein the yeast is separated from the medium either by filtration or by the use of a centrifuge.

(b) "ON STREAM" PHASE

When the yeast is being continuously withdrawn from the ripening stage and the concentrations of yeast and volumes of medium in the fermentation vessels and ripening stage are maintained constant the whole process is operating "on stream" under steady state conditions and this continues until the closing down phase.

While the process is operating under "on stream," conditions are maintained constant to control the qualities of the yeast produced. For example in a process in which there are $n$ fermentation vessels before the ripening stage and where $n$ is an integer between 3 and 6, it is preferred to maintain temperatures in vessels 1 to $n-1$ in the range 75° F. to 92° F. and in vessel $n$ in the range 90° F. to 95° F. The pH value in these vessels is preferably maintained in the range 3 to 4.5 and 4.5 to 5.5 respectively. The nitrogen feed to vessel 1 to $n-1$ is preferably maintained in the range 0.67 to 0.92 gram of assimilable nitrogen per 100 grams of molasses supplied to the vessel and in vessel $n$ the nitrogen feed is maintained in the range 0 to 0.24 gram of assimilable nitrogen per 100 grams of molasses supplied to this vessel.

Phosphate, for example as aqueous diammonium phosphate solution, is preferably added only to the first fermentation vessel of the series and in an amount sufficient to give a yeast from the process having a phosphorus content (estimated as $P_2O_5$) of 2.0% to 2.8% based on the dry matter content of the yeast.

(c) CLOSING DOWN PHASE

When the continuous process is to be closed down the flow to the first vessel, of nutrients and water, if added separately, is reduced or stopped and the rate of aeration to this vessel is reduced. Transfer to vessel 2 is then continued at the original rate until vessel 1 is empty.

This process is repeated in subsequent vessels until all vessels and the ripening vessel, are empty.

The minimum emptying time of each vessel is the average retention time in that vessel and the minimum total time for closing down the process is the total retention time in all fermentation vessels plus the retention time in the ripening stage.

An alternative method of closing down the process is to stop the transfer of yeast-containing medium between vessels and to withdraw yeast-containing medium from the ripening stage to recovery after an appropriate retention time. In the meantime the separate fermentation vessels are treated as separate batch fermentations and the conditions of fermentation varied accordingly to provide a yeast having the desired qualities. The yeast in the fermentation vessel before the ripening stage, for example, is suitably subjected to ripening conditions before being passed to recovery. Similarly the yeast in the vessel before the final fermentation vessel is suitably subjected to conditions of increased pH value and increased temperature for a predetermined period before being subjected to ripening conditions and passed to recovery. Thus the contents of the fermentation vessels are in a suitable condition for recovery at different times, thus avoiding overloading of the recovery stage.

The "closing down" stage is thus completed. It is to be understood that the concentration of yeast cells in the fermentation vessels during the operation of the process may be the same in all vessels or the concentration may vary from vessel to vessel as desired providing the concentration in each vessel remains constant during the steady state phase.

It is preferred that each vessel when under steady state conditions shall produce yeast at a rate equal to the maximum rate of production achieved during the "starting up" phase in that vessel, although in certain cases it may be preferable to produce yeast at a slower rate to give yeast having special qualities.

It may be desirable to introduce new yeast in to the process, for example when infection has increased beyond allowable limits. It may also be desirable in the present process to separate one or more of the fermentation vessels from the process for the purposes of cleaning.

The introduction of new yeast into the process may conveniently be accomplished where additional fermentation vessels are available by seeding nutrient medium in the additional fermentation vessel with a fresh batch of seed yeast and growing this, preferably exponentially, by the addition of nutrients and with aeration until a desired concentration of yeast is achieved when the rate of aeration and addition of nutrients is maintained constant at a predetermined value.

Meanwhile, the addition of nutrients and additional water if added, to the first vessel is reduced and the transfer of yeast-containing medium to the second vessel of the series continued until the first vessel is empty when it may be cleaned, and sterilised if desired, before transferring yeast-containing medium to it from the additional vessel in which the yeast has been grown as described above. The first vessel of the original series thus becomes the second vessel of the new series.

The feed of nutrients and water to the second vessel of the original series is then stopped and transfer from this vessel is continued until it is empty when it is cleaned, and, if desired sterilised, before receiving yeast-containing medium from the preceding vessel which has now reached the desired steady state conditions again after cleaning.

This process is repeated with the remaining vessels.

The conditions of aeration and nutrient feed and volume of medium in the last fermentation vessel of the original series are then adjusted to provide the required ripening conditions in that vessel and the ripening vessel of the original series is available after cleaning and sterilisation for use as a spare fermentation vessel to repeat the cleaning out process, if desired.

The fermentation conditions in the vessel before the ripening stage are normally very suitable for the growth of infecting bacteria, since a higher pH value and temperature are desirable in this vessel. It has been found that the period in which the continous process of the present invention can operate at an acceptable level of infection can be at least prolonged if the cleaning out process described previously is applied to this vessel only. Thus the feed of nutrients and water to this vessel are reduced and transfer of yeast containing medium to the ripening stage is continued until the vessel is emptied for cleaning. In the meantime nutrient medium is transferred from the preceding vessel to an additional vessel which has been cleaned and sterilised and which is provided with a nutrient feed, and when this is full and producing yeast under the desired steady state conditions yeast-containing medium is transferred to the ripening stage. The empty vessel may then be isolated from the system and cleaned and sterilised.

If desired this process may be applied to the last two fermentation vessels before the ripening stage.

The drawing accompanying the specification shows a flow sheet for the process of the present invention.

Vessels 1, 2, 3 and 4 are fermentation vessels to which air is supplied through pipe 5 and side branches 6. Reservoir 7 contains ammonium hydroxide and ammonium sulphate solutions and reservoir 7A contains diammonium phosphate solution. Reservoirs 8, 9 and 10 contain ammonium hydroxide and ammonium sulphate only to control the pH value as desired and to provide assimilable nitrogen. Reservoirs 11, 12, 13 and 14 contain molasses. Water, below about 25° C., is supplied through pipe 16 and side branches 17. Additional cooling is provided by water circulating through jackets 18 surrounding the vessels.

Vessel 19 when used as the ripening stage is supplied only with air.

Transfer of yeast-containing medium between the vessels is accompanied by means of pumps 20 and yeast-containing medium is pumped by pump 21 to the filter 22 for recovery of the yeast cells.

When the process is commenced yeast is added to vessel 1 and molasses added exponentially. Ammonium sulphate, hydroxide and phosphate are also added and air is passed through the medium to allow growth of the yeast to the predetermined amount. When the desired quantity of yeast in vessel 1 has been achieved water is added to provide the predetermined volume in the vessel before transfer commences to vessel 2, and the rate of addition of nutrients and additional water is maintained to give the desired production rate and to maintain the pH at the desired level.

Transfer of yeast-containing medium to vessel 2 is carried out at a rate which maintains the concentration of cells and volume of medium in vessel 1 at the predetermined level, that is it is equated to the rate of addition of nutrients and water and to the rate of production of yeast cells in vessel 1.

During transfer of yeast-containing medium to vessel 2 nutrients are fed to this vessel at such a rate as to provide suitable growth of the yeast including that introduced from vessel 1 until the desired quantity of yeast is present. Water is then added to give the predetermined volume in vessel 2 and transfer is commenced to vessel 3 at a rate calculated to maintain the concentration of cells and volume constant in vessel 2 and the process is then repeated for this vessel and for vessel 4.

From vessel 4, when the desired concentration of cells, and volume of medium have been achieved, yeast-containing medium is passed to the ripening stage, vessel 19, until the predetermined volume in the vessel is achieved (without additions of nutrients and additional water). The yeast-containing medium from vessel 19 is then continuously transferred to recovery where yeast cells are filtered off.

The following examples are given to illustrate the process of the present invention.

*Example 1*

Six fermentation vessels A, B, C, D, E and F were set up with provision for transfer of medium and yeast cells from one vessel to the next when the medium in the vessel reached a predetermined level. Aeration was provided to each vessel and vessel A to E inclusive were fitted with means to provide controlled feeds of aqueous solutions of molasses, ammonium hydroxide and ammonium sulphate. In vessel A a feed of aqueous diammonium phosphate was also provided. The temperature of each vessel could be controlled by means of water circulating through jackets surrounding the fermentation vessels.

Seed yeast, together with nutrient medium containing excess molasses was introduced into vessel A and air was passed through the medium for about 6 hours. After this time the air rate was increased and an exponential feed of molasses was commenced and continued for 9 hours when a rate of 194 grams/hour was reached which was estimated to provide 175 grams of yeast per hour and to maintain a concentration of yeast in the fermentation vessel A of 70 grams/litre at a predetermined transfer rate to the next fermentation vessel B. The rate of feed of molasses was then kept constant at 194 grams/hour.

When the volume of the fermentation medium reached 20 litres at the desired concentration of yeast cells, the transfer of medium to vessel B was commenced at a rate of 2.5 litres per hour.

The rates of addition of nutrients other than molasses together with the temperature and pH of vessel A is given in Table 1.

Medium and yeast cells were then transferred from vessel A to vessel B until a volume of 20 litres had been transferred to this vessel; when transfer was commenced to vessel C. Molasses was fed to vessel B from the commencement of transfer from vessel A so as to reach a rate of 194 grams/hour (i.e. the same rate as in vessel A). Other nutrients were added as shown in Table 1.

This process was repeated through vessels C, D and E. The rate of addition of molasses to each vessel remained the same as that to vessel A (194 grams/hour) but the amounts of other nutrients varied (as shown in Table 1) and depended upon the pH and formol value required. The rates of transfer between vessels were as shown in Table 1.

No nutrients were added to vessel F which constitutes the ripening stage and aeration to that vessel was less than that to vessels A and E. Overflow from this vessel to the recovery stage commenced at a volume of 12.5 litres, which volume provided a suitable mean retention time for the yeast in the ripening stage.

TABLE 1

| Vessel | A | B | C | D | E | F |
|---|---|---|---|---|---|---|
| Transfer rate (litres/hr.) | 2.5 | 5.0 | 7.5 | 10 | 12.5 | 12.5 |
| Net yeast production (grams/hour at 27% dry matter) | 175 | 175 | 175 | 175 | 175 | nil |
| Yeast transfer (grams/hour) | 175 | 350 | 525 | 700 | 875 | 875 |
| Diammonium phosphate (grams/hour) | 9.7 | | | | | |
| Ammonium sulphate (grams/hour) | 11.1 | 2.8 | | | | |
| Ammonium hydroxide (0.880) (mls./hour) | 4.5 | 11.7 | 13.9 | 13.9 | 3.6 | |
| Temperature, °F. | 80 | 80 | 80 | 80 | 90 | 85 |
| pH | 3.2 | 3.8 | 4.5 | 5.1 | 4.6 | |

Total yeast production was 875 grams/hour.

Under the above conditions the growth modulus in each fermentation vessel of 0.125 was found to provide a yeast of excellent baking and keeping properties.

*Example 2*

The process described in Example 1 is repeated with the exceptions that the rate of transfer of yeast-containing medium between the vessels is reduced and the concentration of cells in each vessel is increased as shown in Table 2 below to provide a growth modulus in each vessel of 0.05. Total yeast production is 875 grams/hour.

TABLE 2

| Vessel | A | B | C | D | E | F |
|---|---|---|---|---|---|---|
| Transfer rate (litres/hour) | 1 | 2 | 3 | 4 | 5 | 5 |
| Concentration of yeast (grams/litre at 27% dry matter) | 175 | 175 | 175 | 175 | 175 | 175 |

*Example 3*

The process described in Example 1 is repeated with the exceptions that the rate of transfer of yeast-containing medium between vessels is increased and the concentration of cells in the fermentation vessel decreased as shown in Table 3 to provide a growth modulus in each vessel of 0.20.

TABLE 3

| Vessel | A | B | C | D | E | F |
|---|---|---|---|---|---|---|
| Transfer rate (litres/hour) | 4 | 8 | 12 | 16 | 20 | 20 |
| Concentration of yeast (grams/litre at 27% dry matter) | 43.7 | 43.7 | 43.7 | 43.7 | 43.7 | 43.7 |

*Example 4*

A continuous fermentation process was set up having only three fermentation vessels A, B and C before the ripening stage vessel D. Fermentation was commenced substantially as described in Example 1 and was continued under the operating conditions given in Table 4 below to provide a growth modulus of 0.10 in vessels A, B and C.

TABLE 4

| Vessel | A | B | C | D |
|---|---|---|---|---|
| Molasses supplied (grams/hour) | 200 | 200 | 200 | |
| Nett yeast production at 27% dry matter (grams/hour) | 180 | 180 | 180 | |
| Transfer rate (litres/hour) | 2 | 4 | 6 | 6 |
| Retention time (hrs.) | 10 | 5 | 3.33 | 1 |
| Yeast concentration (grams/litre) | 90 | 90 | 90 | 90 |
| Temperature (°F.) | 80 | 80 | 95 | 80 |
| Diammonium phosphate (grams/hour) | 6 | | | |
| Ammonia (1 vol. 0.88 to 3 vols. water) (mls./hour) | 35 | 71 | | |
| Ammonium sulphate (mls. of 30% solution/hour) | 36 | | | |

Water was added at a rate of 2 litres/hour to vessels A, B and C.

A yeast of good commercial quality was produced under these conditions.

*Example 5*

The process described in Example 4 was repeated under the operating conditions shown in Table 5 below to provide a growth modulus in vessels A, B and C of 0.15.

TABLE 5

| Vessel | A | B | C | D |
|---|---|---|---|---|
| Molasses supplied (grams/hour) | 200 | 200 | 200 | |
| Nett yeast production at 27% dry matter (grams/hour) | 180 | 180 | 180 | |
| Transfer rate (litres/hour) | 3 | 6 | 9 | 9 |
| Retention time (hrs.) | 6.67 | 3.33 | 2.22 | 1 |
| Yeast concentration (grams/litre) | 60 | 60 | 60 | 60 |
| Temperature (°F.) | 80 | 80 | 95 | 80 |
| Diammonium phosphate (grams/hour) | 6 | | | |
| Ammonium (1 vol. 0.88 to 3 vols. water) (mls./hour) | 35 | 71 | | |
| Ammonium sulphate (mls. 30% solution/hour) | 36 | | | |

Water was added at a rate of 3 litres/hour to each vessel.

A yeast of good commercial quality was produced under these conditions.

*Example 6*

The process described in Example 4 was repeated under the operating conditions described below in Table 6 which provide decreasing growth modulus in vessels A to C of 0.125, 0.10 and 0.083 respectively.

TABLE 6

| Vessel | A | B | C | D |
|---|---|---|---|---|
| Molasses supplied (grams/hour) | 200 | 200 | 200 | |
| Nett yeast production at 27% dry matter (grams/hour) | 180 | 180 | 180 | |
| Transfer rate (litres/hour) | 2.5 | 4 | 5 | 5 |
| Retention time (hrs.) | 8 | 5 | 4 | 1 |
| Yeast concentration (grams/litre) | 72 | 90 | 108 | 108 |
| Temperature (°F.) | 80 | 80 | 95 | 80 |
| Diammonium phosphate (grams/hour) | 6 | | | |
| Ammonia (1 vol. 0.88 to 3 vols. water) (mls./hour) | 28 | 50 | 20 | |
| Ammonium sulphate (mls. 30% solution/hour) | 37 | 10 | | |
| Total amount of yeast in each vessel (grams) | 1,440 | 1,800 | 2,160 | 540 |

A yeast of excellent commercial properties was produced under these conditions.

*Example 7*

The process described in Example 4 was repeated under the operating conditions described in Table 7 below which provide a growth modulus of 0.083 in vessels A, B and C.

TABLE 7

| Vessel | A | B | C | D |
|---|---|---|---|---|
| Molasses supplied (grams/hour) | 200 | 200 | 200 | |
| Nett yeast production at 27% dry matter (grams/hour) | 180 | 180 | 180 | |
| Transfer rate (litres/hour) | 1.67 | 3.33 | 5.0 | 5.0 |
| Retention time (hours) | 12 | 6 | 4 | 1 |
| Yeast concentration (grams/litre) | 108 | 108 | 108 | 108 |
| Temperature (° F.) | 80 | 80 | 95 | 80 |
| Diammonium phosphate (grams/hour) | 6 | | | |
| Ammonia (1 vol. 0.88 to 3 vols. water) (mls./hour) | 25 | 50 | 20 | |
| Ammonium sulphate (30% solution) (mls./hour) | 40 | 10 | | |
| Total yeast in each vessel (grams) | 2,160 | 2,160 | 2,160 | 540 |

A yeast of excellent commercial properties was produced under these conditions.

I claim:
1. A continuous process for growing yeast under conditions of aeration in a liquid nutrient medium in at least two fermentation vessels which comprises introducing into the first vessel yeast, nutrients and water, continuing the growth of the yeast and the addition of nutrients and water until a quantity of yeast and medium in this vessel has been reached, thereafter continuing to add nutrients and water to the first vessel and continuing to grow yeast therein, while maintaining the volume of its contents and concentration of yeast cells constant by transferring to the second vessel yeast-containing medium at a rate equal to the rate of addition of nutrients and water, adding nutrients and water to the second vessel until a quantity of yeast and medium in this vessel has been reached and thereafter continuing to add nutrients and water and continuing to grow yeast therein while maintaining the volume of its contents and concentration of yeast cells constant by withdrawing yeast-containing medium at a rate equal to the rate of addition of the nutrients, water and yeast-containing medium and repeating the process of the second vessel in any other fermentation vessels present before passing yeast-containing medium withdrawn from the final fermentation vessel into a further vessel where yeast ripening conditions are maintained and thereafter recovering the yeast cells, the conditions of fermentation in the fermentation vessels and rate of transfer being so controlled as to provide a growth modulus in the range of 0.05 to 0.20.

2. A process as claimed in claim 1 wherein there are at least three fermentation vessels before the ripening stage.

3. A process as claimed in claim 1 wherein the growth modulus in each fermentation vessel is maintained in the range 0.075 to 0.175.

4. A process as claimed in claim 1 wherein water, in addition to that containing nutrients, below about 25° C.

is added to one or more of the fermentation vessels in order to provide cooling.

5. A process as claimed in claim 1 wherein the rate of production of yeast in a fermentation vessel under steady state conditions is substantially equal to the maximum rate of production achieved during the "starting up" phase in that vessel.

6. A process as claimed in claim 1 which includes the step of seeding nutrient medium in the first fermentation vessel, adding to the medium in this vessel nutrients, and water and passing air through the medium in such a manner as to allow the yeast to grow until a predetermined quantity of yeast is present in the vessel before transferring yeast-containing medium to the second fermentation vessel.

7. A process as claimed in claim 1 wherein there are $n$ vessels before the ripening stage $n$ being an integer between 3 and 6, and wherein the fermentation conditions in these vessels are maintained in the ranges given below:

| Condition | Vessels $n$ to $n-1$ | Vessel $n$ |
|---|---|---|
| Growth modulus | 0.075 to 0.175 | 0.075 to 0.175. |
| Temperature, °F | 75 to 92 | 90 to 95. |
| pH | 3.0 to 4.5 | 4.5 to 5.5. |
| Grams assimilable nitrogen per 100 grams of molasses added. | 0.67 to 0.92 | 0 to 0.24. | and wherein phosphate, estimated as $P_2O_5$, is added to vessel 1 at a rate give a yeast containing 2.0% to 2.8% of phosphate, as $P_2O_5$, based upon the dry matter of the yeast.

8. A process as claimed in claim 1 which includes the step of reducing the flow of nutrients and water in addition to that containing nutrients to the first fermentation vessel while continuing transfer of yeast-containing medium to the second vessel until the first vessel is empty, thereafter repeating this step in subsequent vessels until substantially all the yeast has been withdrawn from the vessels.

9. A process as claimed in claim 1 which includes the step of stopping the transfer of medium between vessels and recovering the yeast produced in each vessel.

References Cited in the file of this patent
UNITED STATES PATENTS

| 1,891,841 | Sak | Dec. 20, 1932 |
| 2,371,208 | Alzola | Mar. 13, 1945 |
| 2,657,174 | Stich | Oct. 27, 1953 |

FOREIGN PATENTS

| 299,336 | Great Britain | Oct. 22, 1928 |
| 346,361 | Great Britain | Apr. 7, 1931 |